United States Patent [19]

Nelson

[11] Patent Number: 4,769,299

[45] Date of Patent: Sep. 6, 1988

[54] HIGH RATE SEALED LEAD-ACID BATTERY WITH ULTRATHIN PLATES

[75] Inventor: Robert F. Nelson, Englewood, Colo.

[73] Assignee: Gates Energy Products, Inc., Gainesville, Fla.

[21] Appl. No.: 879,674

[22] Filed: Jun. 27, 1986

[51] Int. Cl.⁴ .......................................... H01M 10/06
[52] U.S. Cl. ...................... 429/57; 429/204; 429/225; 429/241; 429/245; 429/247
[58] Field of Search ............... 429/225, 228, 94, 57, 429/204, 245, 247, 252, 241, 242

[56] References Cited

U.S. PATENT DOCUMENTS

| | | | |
|---|---|---|---|
| 3,447,969 | 6/1969 | Tudor et al. | 429/225 X |
| 3,494,800 | 2/1970 | Shoeld | 29/623.1 |
| 3,846,175 | 11/1974 | Desai | 429/54 |
| 3,862,861 | 1/1975 | McClelland et al. | 429/94 X |

FOREIGN PATENT DOCUMENTS

| | | |
|---|---|---|
| 407845 | 12/1969 | Australia. |
| 1782752 | 2/1959 | Fed. Rep. of Germany. |
| 1032852 | 6/1966 | United Kingdom. |

*Primary Examiner*—Anthony Skapars
*Attorney, Agent, or Firm*—C. H. Castleman, Jr.; H. W. Oberg, Jr.; J. E. Ebel

[57] ABSTRACT

A normally sealed starved electrolyte recombinant lead-acid cell of high discharge rate capability whose plates have a thickness from about 0.007 to about 0.027 inches, and whose grids are formed of high hydrogen overvoltage lead with a thickness of from about 0.005 inches to no more than 0.019 inches, with an inter-plate spacing of typically from about 0.005 to about 0.020 inches.

25 Claims, 2 Drawing Sheets

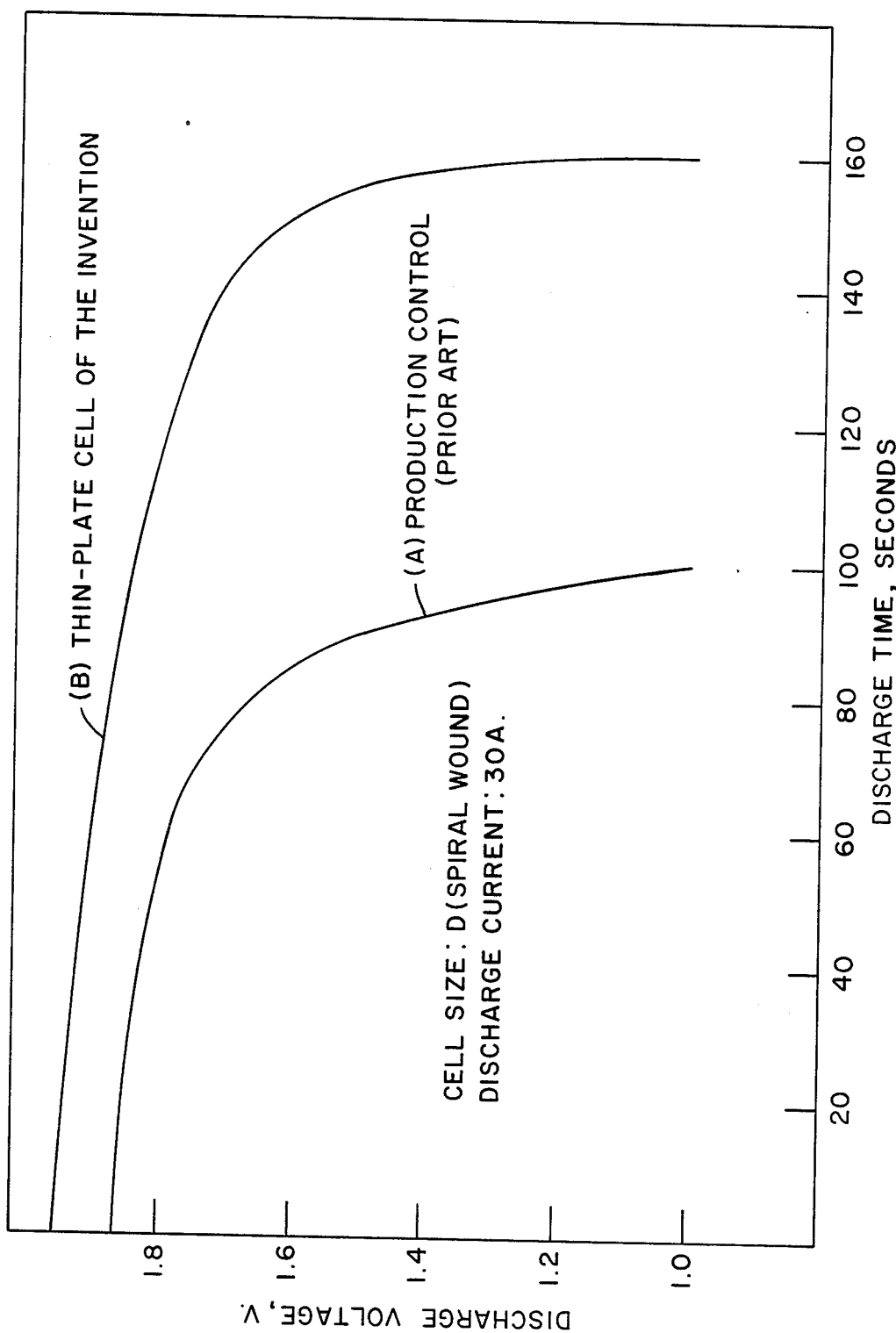

HIGH RATE SEALED LEAD-ACID BATTERY WITH ULTRATHIN PLATES

BACKGROUND OF THE INVENTION

This invention relates to sealed rechargeable lead-acid cells and batteries of the starved electrolyte type in which oxygen generated toward the end of charge and on overcharge is internally recombined within the battery at high efficiencies. More particularly, the invention relates to such a lead-acid cell that has a high rate discharge capability.

A prominent failure mode for lead-acid batteries, whether of the open or sealed type, is corrosion of the positive current collector grid. Thus, it has been a common practice in the industry to insure that the positive grid has adequate thickness to withstand the degradation caused by corrosion during service. For the same reason, oftentimes the positive grids/plates are made considerably thicker than the opposite polarity negative grid/plates used in the battery.

To achieve optimum high rate discharge capability, in theory one would prefer to use thinner plates to reduce the current density on discharge. However, corrosion, particularly of the positive grid as aforementioned, has placed limitations on how thin the plates can be made in practice. Use of thin grid/plates also presents problems in assembling of the cells. U.S. Pat. No. 3,862,861 to McClelland et al discloses a normally sealed rechargeable lead-acid cell of the starved electrolyte type in which oxygen generated toward the end of charge and during overcharge has free access to the negative plate active material through voids in the plates/separator porous matrix. In practice, plates made in accordance with the McClelland et al patent have typically had a thickness of about 0.044 inches (grid typically 0.032 inches), and the patent discloses a grid thickness ranging from 0.020 inches to 0.45 inches. It is recognized in that patent that the grid strands in the positive plate are slowly converted from lead to lead dioxide, and too thin a strand thickness will shorten the life of the cell.

European patent application No. 0 141 568 A1 to Okada et al discusses grid/plate thickness for starved electrolyte batteries and concludes that a battery to have superior high rate discharge characteristics without sacrificing various other characteristics should optimally have a grid thickness for the positive plate of 3 mm to 4 mm, whereas the aforementioned grid thickness of the commercial embodiment of U.S. Pat. No. 3,862,861 was approximately 1.0 mm (0.039 inches) or less.

It is also known that in sealed lead-acid recombinant batteries the possibility of short-circuiting increases with decreasing inter-plate spacing. Positive plate growth during cycling adds to the problem. European patent application No. 0 141 568 teaches an inter-plate spacing of 0.95 mm (0.037 inches), and that the thickness of the separators are desirably in the range of 0.4 to 0.25 times the thickness of the positive plates; i.e., suggesting a minimum inter-plate spacing of about 0.75 mm (0.030 inches).

U.S. Pat. Nos. 3,395,043 and 3,494,800 to Shoeld disclose flooded lead-acid batteries (nonsealed) employing lead foil substrates of 0.002 inches thick on which is applied on both surfaces active material to a thickness of 0.006 inches. A separator consisting of three layers of conventional rubber latex impregnated kraft paper of 0.008 inches thickness per layer is interposed between the electrodes and wound into a spiral configuration. To Applicant's knowledge, this battery was never commercialized and its technical practicality has to be doubted.

It is an object of the subject invention to produce a rechargeable lead-acid cell of the sealed recombinant type having extremely high discharge rate capability, provided in part by using ultrathin grid/plates, close inter-plate spacing and a construction in which positive grid corrosion is minimized to the extent that it is no longer a significant problem, and wherein an extremely high plate surface area is defined per unit of volume of cell element, thereby enhancing the high rate capability of the cell.

SUMMARY OF THE INVENTION

Briefly described, the invention is directed to a normally sealed rechargeable lead-acid cell of the starved electrolyte type operating with internal oxygen recombination on charge, and including: porous positive and negative electrode plates, each having major faces and a thickness of from about 0.007 to about 0.027 inches, and formed of electrochemically active material respectively pasted on high hydrogen overvoltage foraminous lead grids, each grid having a thickness of from about 0.005 inches to no more than 0.019 inches; porous, electrolyte-absorbent compressible separator interposed between the positive and negative plates and compressed against the major faces of such plates to define, in combination, a cell pack; the geometric surface area of the major faces of both of such plates being at least about 28 square inches per cubic inch of volume of the cell pack; liquid acid electrolyte in a starved amount absorbed in the pores of the plates and separator; and a container encapsulating the cell pack in a normally sealed configuration.

The cell of the invention may be used for any purpose to which lead-acid cells have been used in the past, but is especially useful in high rate cells for engine starting (e.g. aircraft start), and enables spirally wound cells to be produced having smaller outside diameters (e.g., C size or AA size) than heretofore technically possible.

BRIEF DESCRIPTION OF THE DRAWINGS

Preferred embodiments of the invention will be illustrated in conjunction with the accompanying drawings, in which like numerals designate like parts, and in which:

FIG. 5 depicts discharge curves comparing cells of the invention with conventional cells.

PREFERRED EMBODIMENTS OF THE INVENTION

Figure 1:
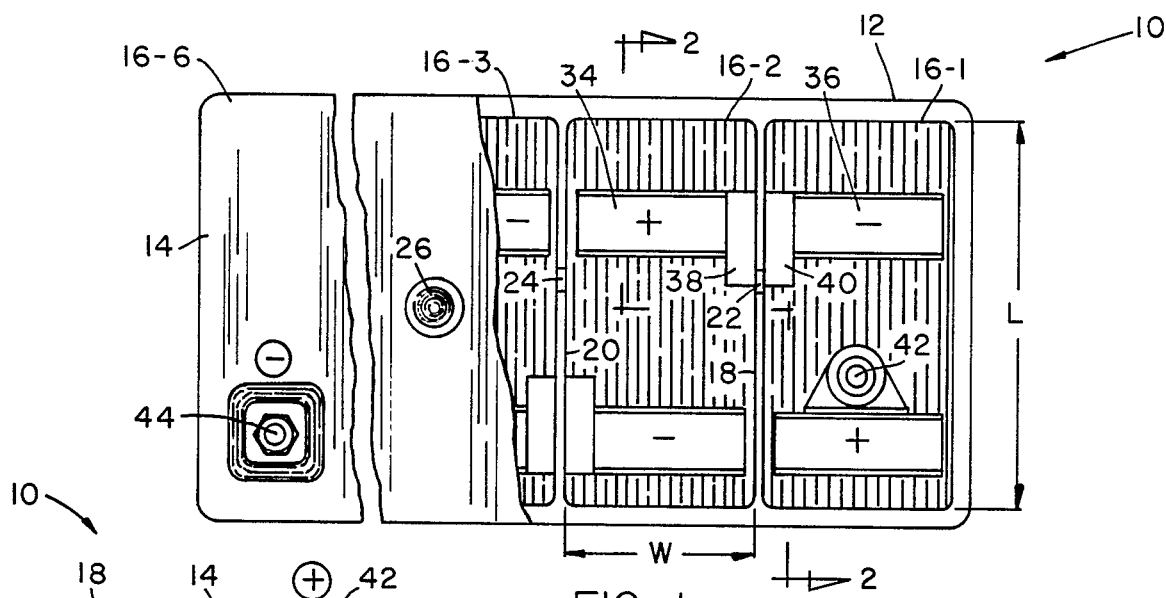
FIG. 1 is a partially broken away, top view of a sealed recombinant six cell (12 volt) battery of standard prismatic configuration.

Referring to the drawings, the battery of the invention is shown generally at 10 and includes a nonconductive housing composed of a jar or container 12 sealingly joined to a lid 14. The housing contains six cells 16-1, 16-2, 16-3 ... -6 separated by nonconductive partitions 18, 20, ..., which may be integrally molded with and form a part of the housing. Each of the partitions in turn may be provided with notches 22, 24, which define a passageway common to and interconnecting the cells, and which communicate with resealable Bunsen valve 26, set to relieve internal pressure above a desired superatmospheric pressure (for additional details in respect of the sealed gas recombining lead-acid battery, see the aforementioned U.S. Pat. No. 3,862,861 and U.S. Pat. No. 4,383,011). A vented top cover (not shown) will normally be positioned over valve 26 to insure resealing. In general, the materials and arrangement of cell components are chosen to provide a battery capable of discharge and charge (including overcharge) in any indiscriminate attitude without electrolyte loss, and with the ability to recombine oxygen using the "oxygen cycle" at high rates of efficiency (e.g., above about 99% at a minimum C/20 overcharge rate).

Each cell contains at least one positive plate 27 and at least one negative plate 25 spaced by interposed compressible separator elements 29. Normally there will be provided a plurality of each polarity plate within a given cell stacked in interleaved parallel (prismatic) fashion; however, continuous plates may also be employed rolled together in a spiral as in FIG. 4, flat wound as shown in U.S. Pat. No. 4,383,011, interleaved in accordion style, or the like. Each positive plate is formed with electrochemically active material 17, namely lead dioxide in the charged state, applied to lead grid 28, and similarly for the negative plate electrochemically active sponge lead material 15 is applied to a lead grid 30. The grids 28, 30, which may be identical in construction, are foraminous in that they are formed with through openings 23 and corresponding grid strands 21. The grids are further provided with respective projecting positive plate tabs 31 and negative plate tabs (not shown). Each cell has its tabs of alternate polarity united to a common polarity positive strap 34, and negative strap 36, respectively. Typically, the straps are joined to the tabs by the cast-on process, although other techniques may be employed.

The positive and negative straps, which typically may have the same cross section and length, preferably are formed with integral upstanding lugs e.g., 38, 40, which are joined together in sealing relationship through an aperature formed in partition 18 by any desired method, such as by the extrusion fusion process. In this manner, the cells are series connected to form a 12-volt battery. The end cells 16-1 and 16-6 are provided with the usual positive and negative output terminals 42, 44, which make a through-the-lid sealed connection with the corresponding positive ahd negative straps.

The opposite polarity plates are formed by supplying paste in the normal manner onto both sides as well as filling the interstices 23 of grids 28 and 30. The electrode plates of this invention are ultrathin, having a thickness P (see FIG. 3) of from about 0.007 to about 0.027 inches, more preferably from about 0.011 to about 0.026 inches, and most preferably from about 0.014 to about 0.018 inches. The unformed paste material for the positive plate may suitably be a high density material of substantially 75% by weight litharge (PbO) and 25% red lead ($Pb_3O_4$), together with any added components such as bulking agents or binders. To these components is added sufficient water to obtain a paste having in the preferred embodiment a density of approximately 3.6 to about 4.8 grams of paste per cubic centimeter of mixture. Sulfated, lower density pastes may also be used with advantage, as dictated by the desired properties of the battery. Similarly, the unformed negative paste material may be formed of a high density material composed, for instance, of 100% litharge in addition to the normal expander and binder together with water to yield a paste density of about 4.0 to about 4.8 grams per cubic centimeter. For high rate performance, a sulfated paste of relatively lower density is formed preferably of leady oxide (litharge plus about 20-30 percent free lead particles) together with expander and an aqueous solution of sulfuric acid.

The grids 28, 30 may be made of cast or wrought lead, for instance, formed into a perforated sheet, as shown, or expanded mesh. Continuous direct cast grids may also be used. The lead used for the grid critically must have a high hydrogen overvoltage as it has been found that this feature, in combination with the other features of the invention, leads to minimal corrosion of the positive grid. Preferably, both positive and negative grids are formed of substantially pure lead of at least about 99.9% by weight purity, more preferably of at least 99.99% by weight purity, with the impurities not serving to substantially reduce the hydrogen overvoltage especially in the negative plate. Less preferably, an alloy of lead, naturally having a relatively high hydrogen overvoltage, such as lead/calcium, lead/calcium/tin, or the like may be employed. Very high purity unalloyed lead also offers the additional advantage of pliability, particularly in view of the ultrathin thickness of the grids/plates, to facilitate winding or folding if that is contemplated. The grid will be sufficiently pliable if the lead or lead alloy under the conditions of use has a Brinell hardness (10 mm/31 kg-120 sec.) of preferably less than about 10 kg/mm$^2$, and more preferably less than about 8kg/mm$^2$.

Figure 3:
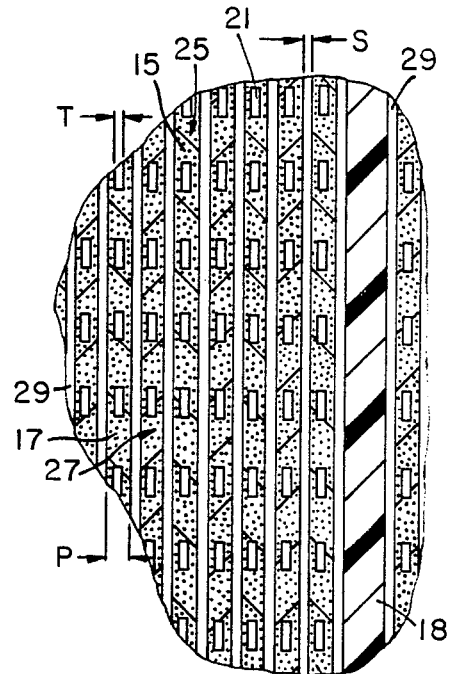
FIG. 3 is an enlarged partial sectional view taken along section 3—3 of FIG. 2.

Referring to FIG. 3, the thickness T of the strands 21 of a grid are preferably from about 0.005 inches to no more than 0.019 inches, more preferably from about 0.009 to about 0.017 inches, and most preferably from about 0.011 to about 0.016 inches. These dimensions pertain to an unformed or freshly formed cell or battery. The thickness particularly of the positive grid may increase after substantial cycling of the cell or battery. Grid thicknesses above 0.019 inches increase the current density unacceptably, and thicknesses below about 0.005 inches create handling and pasting problems during manufacture, and increase the tendency to short circuit during cycling.

The separator 29 of the invention is similar to separators previously used for sealed lead-acid batteries operating on the oxygen recombination principle. In particular separators of one or more layers of silica base, preferably separators formed of a highly absorptive porous mat of acid-wettable binder-free microfine glass fibers are used. Typically, a mix of fibers may be employed whose individual fibers range in average diameter from about 0.2 to about 10 microns, more preferably from about 0.4 to 5.0 microns, with possible minor amounts of larger gauge fibers to facilitate production of the mat. The porosity must be high and in particular preferably from about 80% to about 98% and more preferably from about 85% to about 95%, in the compressed state in the cell (slightly higher in the uncompressed state). The separator also has a relatively high surface area, in the range of approximately 0.1 to 20 m$^2$/g of silica, which makes it possible to absorb and retain relatively large amounts of acid electrolyte volumetrically and still have a substantial unfilled pore volume permeable to gas, i.e., oxygen, for transport directly through the separator for consumption at the negative electrode. The most preferred separator materials have a surface area as measured by the BET method of from about 0.2 to about 3.0 m²/g, more preferably from about 1.0 to about 2.0 m²/g.

The separators are compressible and are compressed against the major faces of the plates (seen best in FIG. 2, with dimensions of height H and cross width D) with the plates and separators of a cell pack preferably being under firm mutual stacking pressure. The end walls and intercell partitions constrain and are in direct contact with the cell pack. In the usual manner for starved recombinant batteries, sulfuric acid liquid electrolyte is absorbed within the electrode plates and separator material, in the pore structure thereof, in a starved amount (less than saturated), such that evolved gasses will be able to readily diffuse through voids in the porous elements forming a low tortuosity path to be internally recombined at thin film sites i.e., oxygen evolved at the positive plate diffuses in the gas phase directly through voids in the separator 29 and then diffuses through a thin layer of electrolyte (also defining voids) on the negative active material to be consumed. Preferably such thin layer is substantially homogeneously distributed throughout the negative (and positive) plate, the extent of such thin layer determined by the degree of starvation of the plate.

It has been found that the corrosion rate of the grid strands 21, and particularly the grid strands of the positive plate, is reduced also by employing in combination with other features of the invention a relatively high density electrolyte. In the charged condition of the cell, the specific gravity of the electrolyte is preferably from about 1.200 to about 1.400, more preferably from about 1.300 to about 1.380, and most preferably from about 1.320 to about 1.360. In general, the electrolyte strength will be higher with lesser degrees of paste sulfation and lower for higher levels of paste sulfation; the most preferred range mentioned above is applicable to water-based, largely unsulfated pastes.

To achieve the high rate discharge performance for the cell of the invention, it is critical that the geometric surface area of the major faces of the plates is high per unit of volume of the cell pack compared to conventional recombinant constructions. Thus, in the example of the battery of FIGS. 1 and 2, the geometric surface area of the major faces of the plates is defined by the number of plates employed multiplied by two to give both major faces. The surface area of a given face of a plate, as shown in FIG. 2, is defined by the cross dimension D multiplied by the height of the plate H (excluding grid tabs). The volume of the cell pack is similarly defined as the width of the cell W (see FIG. 1) multiplied by the length of the cell pack L, further multiplied by the height of the plates H. In accordance with the invention, the geometric surface area of the major faces of such plates is at least about 28, more preferably at least about 35, and most preferably at least about 40 square inches per cubic inch of volume of the cell pack.

The high surface area per unit of volume of the plate surfaces is further defined by the plate spacing S, as shown in FIG. 3. In this invention, the average spacing S between the positive and negative electrode plates in the cell pack is preferably from about 0.005 to about 0.020, more preferably from about 0.010 to about 0.018 inches. This spacing applies to a newly formed cell or one having only a few discharge/charge cycles. The spacing in fact will normally be diminished upon further cycling as a result of the growth of positive plate 27, as is known. For example, in test cells of the invention, the unformed or freshly formed spacing between plates averaged about 0.016 inches, and after having been cycled from 66–94 cycles, the average plate spacing had been reduced to 0.011 inches. Even with this minimal interplate spacing, it has been found in accordance with the invention that there is no significant problem with the opposite polarity plates short-circuiting during use.

The ratio of the average interplate spacing S to the average thickness of the negative plate P is preferably from about 0.4 to about 1.4, more preferably from about 0.5 to about 1.0 optimally less than about 0.8. In the preferred embodiment the grids used for both plates are of about the same thickness (before cycling). Even where one plate, e.g., the positive in the following example, carries more paste than the other plate, this ratio of interplate spacing to plate thickness will be similar for each and both will be within the preferred range.

Figure 2:
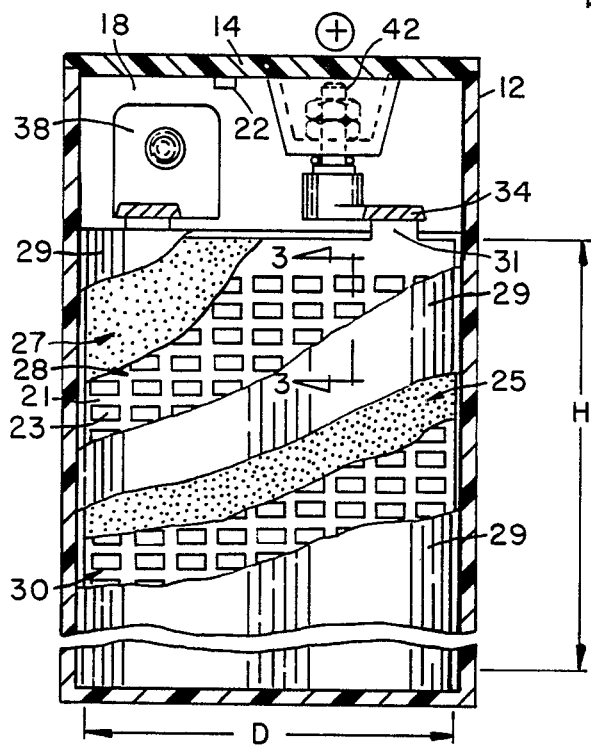
FIG. 2 is a partial sectional, partially broken away view taken along section 2—2 of FIG. 1.
Figure 4:
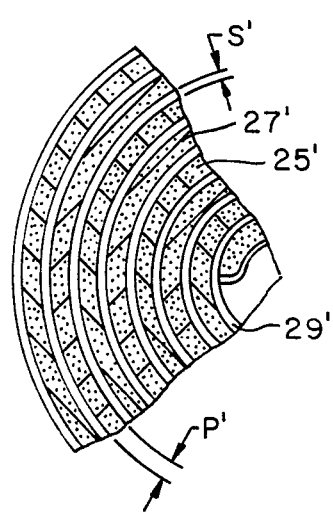
FIG. 4 is a partial transverse sectional view of a cylindrical spirally wound cell showing the relationship of the cell pack elements.

An alternative configuration is shown in FIG. 4 in which the positive plate 27' and negative plate 25' with interposed separator 29' all have the characteristics previously discussed in reference to the embodiment of FIGS. 1–3, and are spirally wound together into the so-called jelly-roll configuration. Cells of this type are shown more fully in U.S. Pat. Nos. 3,862,861 to McClelland et al and 4,112,202 to Hug et al. The advantages of the spiral wound configuration derive from the ability to closely maintain tension during winding of the element to achieve the desired mutual stacking pressure between the plates and separator, from the ability of the cylindrical container to maintain that compression as well as internal pressure without bulging, and from the fact that the plates are continuous.

The following examples demonstrate practical applications of the invention.

EXAMPLE I

A wound cell of a nominal 1.2 Ah capacity at the C/10 rate was constructed having a grid thickness for both plates of 0.015" with an average open area of about 75%, and both grids were 99.99 weight percent pure lead. Both pastes were unsulfated and the positive, comprised of primarily lead oxide and red lead, had a wet paste density of 4.7 g/cm³; the negative, composed of primarily lead oxide and expander, had a wet paste density of 4.5 g/cm³. The separator was made of glass microfiber with a porosity of about 92% and a BET surface area of about 2.0 m²/g. The electrolyte specific gravity was 1.36 and a starved (unsaturated) quantity was added at fill to the plates and separator (cell pack). The cell pack volume was 0.83 in.³ and the total plate geometric surface area (4 faces) was 36.4 in.². The plate thicknesses were 0.026" and 0.022" for the positives and negatives, respectively, and the interplate spacing was 0.016±0.002".

When the cells were put on a one cycle per day regime, recharged at 2.50V and discharged at the C/5 rate (240 mA) constant current with a 1.60V cutoff, they initially delivered about 1.1 Ah. This increased to about 1.3 Ah at 60 cycles and then gradually decreased. Cycle lives of 250–300 (C/5 rate) were achieved with final capacities in excess of 1.1 Ah and when a cell was autopsied after 210 cycles, it was found that the positive grid was intact and had a thickness throughout of 0.014–0.015"; no corrosion was evident. It is clear from these data that with the above configuration, lead-acid cells with ultrathin grids/plates of the type described herein will perform acceptably and, in fact, exceptionally in cycling applications.

It is known from the literature that the corrosion rate of pure lead in 40% sulfuric acid electrolyte is relatively low and in a starved electrolyte system with paste coating the grid, the rate may be even lower. A more important factor may be the fact that in cell packs with ultrathin plates the degree of conversion of dried paste to lead sulfates at filling and of sulfates to active material at formation is more complete than in known cells. This is due to the relatively large surface area available and the thinness of the plates. These factors will also result in lower operating temperatures at the grid/active material interfaces (lower current densities during overcharge/better heat dissipation) and this will also result in lower corrosion rates compared to conventional constructions.

EXAMPLE II

A second example of this invention is illustrated by the discharge curves shown in FIG. 5. These curves were obtained for a standard production 'D' cell (2.0V/2.5 Ah) and a thin-plate 'D' cell in accordance with the invention where both the positive and negative plates were twice as long and half as thick (0.022") as in the standard 'D' cell (0.044"); the plate spacing was also halved (about 0.018" in the cells of the invention, about 0.038" in the control) while the separator and electrolyte amounts and constructions were otherwise the same in both cases. The cell pack volume in both cases was 2.173 in.$^3$ and the total plate geometric surface area (4 faces) was 105 in.$^2$ for the cell of the invention and 52.5 in.$^2$ for the control. Paste compositions, weight and the cell dimensions were also identical.

The cells were subjected to a 30A discharge at ambient temperature (25° C.) and the discharge curves recorded to 1.0V. As can be seen from FIG. 5 the thin-plate cell had a higher voltage plateau and had a considerably longer discharge time (curve B). In fact, the power delivered by the thin-plate cell to 1.0V. was about 90% greater than that obtained from the standard 'D' cell (curve A). FIG. 5 graphically illustrates the ability of the cell of this invention to achieve high-rate volumetric and gravimetric energy densities. With no change in the weight or the volume of the cell, the power delivered at high rates is almost doubled in this case.

While certain representative embodiments and details have been shown for the purpose of illustrating the invention, it will be apparent to those skilled in this art that various changes and modifications may be made therein without departing from the spirit or scope of the invention.

What is claimed is:

1. A normally sealed rechargeable lead-acid cell of the starved electrolyte type which internally recombines oxygen on charging, comprising:
    porous positive and negative electrode plates, each having major faces and a thickness of from about 0.007 to about 0.027 inches and formed of electrochemically active material respectively joined to high hydrogen overvoltage foraminous lead grids, each grid having a thickness of from about 0.005 inches to no more than 0.019 inches;
    porous, electrolyte-absorbent compressible separator interposed between the positive and negative plates and compressed against the major faces of such plates to define, in combination, a cell pack;
    the geometric surface area of the major faces of such plates being at least about 28 square inches per cubic inch of volume of the cell pack;
    liquid acid electrolyte in a starved amount absorbed in the pores of the plates and separator; and
    a container encapsulating the cell pack in a normally sealed configuration.

2. The lead-acid cell of claim 1 wherein the average spacing between the positive and negative electrode plates in the cell pack is from about 0.005 to 0.020 inches.

3. The lead-acid cell of claim 1 wherein the ratio of the average spacing between the plates to the thickness of the negative plate is less than about 0.8.

4. The lead-acid cell of claim 1 wherein the grid of the negative plate has a minimum Pb purity of at least 99.9 percent by weight.

5. A normally sealed rechargeable lead-acid cell of the recombinant type, comprising:
    porous positive and negative electrode plates having substantially equal thicknesses in the range from about 0.007 to about 0.027 inches and formed of electrochemically active material respectively pasted on high hydrogen overvoltage foraminous lead grids, each grid having a thickness of from about 0.005 inches to no more than 0.019 inches;
    porous, electrolyte-absorbent compressible separator interposed between the positive and negative plates and compressed there against under firm mutual stacking pressure;
    the average spacing between opposite polarity plates being between about 0.005 and about 0.020 inches;
    liquid electrolyte in a starved amount absorbed in the pores of the plates and separator; and
    a container encapsulating the plates and separators in a normally sealed configuration.

6. The lead-acid cell of claim 5 wherein the ratio of the average spacing between the plates to the thickness of the negative plate is less than about 0.8.

7. The lead acid cell of claim 5 wherein the grid of the negative plate has a minimum Pb purity of at least 99.9 percent by weight.

8. The lead-acid cell of claim 5 wherein the separator is comprised of a mat of acid-wettable binderfree glass fibers, individual fibers of which have average diameters of from about 0.2 to about 10 microns, and the mat having a porosity of from about 85 to about 95 percent.

9. The lead-acid cell of claim 5 wherein a thin layer of electrolyte is homogeneously distributed throughout the negative plate.

10. A normally sealed rechargeable lead-acid cell of the starved electrolyte type which internally recombines oxygen on charging, comprising:
    porous positive and negative electrode plates, each having major faces and thickness of from about 0.007 to about 0.027 inches and formed of electrochemically active material respectively pasted on high hydrogen overvoltage foraminous lead grids having a purity of at least about 99.9 percent by weight lead, each grid having a thickness of from about 0.005 inches to no more than 0.019 inches;
    porous, electrolyte-absorbent compressible separator of silica base and having a surface area (BET method) of from about 0.1 to about 20 m$^2$/g, interposed between the positive and negative plates and compressed against the major faces of such plates to define, in combination, a cell pack;

the geometric surface area of the major faces of such plates being at least about 28 square inches per cubic inch of volume of the cell pack;

liquid acid electrolyte in a starved amount absorbed in the pores of the plates and separator; and a container encapsulating the cell pack in a normally sealed configuration.

11. The lead-acid cell of claim 10 wherein liquid sulfuric acid electrolyte is employed having a specific gravity of from about 1.300 to 1.380, in the charged condition of the cell.

12. The lead-acid cell of claim 10 wherein the geometric surface area of the major faces of such plates are at least about 35 square inches per cubic inch of volume of the cell pack.

13. The lead-acid cell of claim 10 wherein the average spacing between the positive and negative electrode plates in the cell pack is from about 0.005 to 0.020 inches.

14. The lead-acid cell of claim 1 wherein the average spacing between the positive and negative electrode plates in the cell pack is from about 0.010 to about 0.018 inches.

15. The lead-acid cell of claim 1 wherein the ratio of the average spacing between the plates to the thickness of the negative plate is from about 0.5 to about 1.0.

16. The lead-acid cell of claim 1 employing liquid sulfuric acid electrolyte having a specific gravity of from about 1.300 to about 1.380, in the charged condition of the cell.

17. The lead-acid cell of claim 1 wherein each grid has a thickness of from about 0.009 to about 0.017 inches.

18. The lead-acid cell of claim 5 wherein each grid has a thickness of from about 0.009 to about 0.017 inches.

19. The lead-acid cell of claim 10 wherein each grid has a thickness of from about 0.009 to about 0.017 inches.

20. The lead-acid cell of claim 1 wherein the cell has a minimum cycle life on the order of 200 cycles (one cycle per day regime, recharge at constant voltage and then discharge at C/5 rate to 1.60V cutoff), with the positive grid still being intact after such 200 cycles.

21. The lead-acid cell of claim 5 wherein the cell has a minimum cycle life on the order of 200 cycles (one cycle per day regime, recharge at constant voltage and then discharge at C/5 rate to 1.60V cutoff), with the positive grid still being intact after such 200 cycles.

22. The lead-acid cell of claim 10 wherein the cell has a minimum cycle life on the order of 200 cycles (one cycle per day regime, recharge at constant voltage and then discharge at C/5 rate to 1.60V cutoff), with the positive grid still being intact after such 200 cycles.

23. The lead-acid cell of claim 20 wherein there is substantially no evidence of corrosion of such positive grid after 200 cycles.

24. The lead-acid cell of claim 21 wherein there is substantially no evidence of corrosion of such positive grid after 200 cycles.

25. The lead-acid cell of claim 22 wherein there is substantially no evidence of corrosion of such positive grid after 200 cycles.

* * * * *